United States Patent
Pferdekäemper et al.

(10) Patent No.: US 7,653,667 B2
(45) Date of Patent: *Jan. 26, 2010

(54) METHODS AND SYSTEMS FOR DATA MOVING USING LOCKS

(75) Inventors: Thorsten Pferdekäemper, Walldorf (DE); Martin Fischer, Heidelberg (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/526,748

(22) PCT Filed: Sep. 4, 2003

(86) PCT No.: PCT/EP03/09831

§ 371 (c)(1),
(2), (4) Date: Nov. 8, 2005

(87) PCT Pub. No.: WO2004/025504

PCT Pub. Date: Mar. 25, 2004

(65) Prior Publication Data

US 2006/0242203 A1    Oct. 26, 2006

Related U.S. Application Data

(60) Provisional application No. 60/408,903, filed on Sep. 9, 2002, provisional application No. 60/408,905, filed on Sep. 9, 2002, provisional application No. 60/408,901, filed on Sep. 9, 2002, provisional application No. 60/408,902, filed on Sep. 9, 2002, provisional application No. 60/409,606, filed on Sep. 11, 2002, provisional application No. 60/409,593, filed on Sep. 11, 2002.

(51) Int. Cl.
    *G06F 12/00*   (2006.01)
    *G06F 17/30*   (2006.01)

(52) U.S. Cl. .......................... 707/204; 707/8; 711/161
(58) Field of Classification Search .................. 707/204
See application file for complete search history.

(56) References Cited

U.S. PATENT DOCUMENTS

5,327,556 A    7/1994   Mohan et al.

(Continued)

FOREIGN PATENT DOCUMENTS

EP    0 499 422 A2    8/1992
EP    1 283 477       2/2003

(Continued)

OTHER PUBLICATIONS

R. Schaarschmidt et al., "Konzepte und Implementierungsaspekte anwendungsorientierten Archivierens in Datenbanksystemen," Computer Science, Research & Development, 1998, vol. 13, pp. 79-89.

(Continued)

*Primary Examiner*—Hosain T Alam
*Assistant Examiner*—Shew-Fen Lin
(74) *Attorney, Agent, or Firm*—Finnegan, Henderson, Farabow, Garrett & Dunner, LLP

(57) ABSTRACT

Methods, computer readable medium and systems are provided for moving data objects from a first storage location to a second storage location. One or more data objects may be selected having an identifier from a first storage location. The ID may be stored in at least one transactional type lock object. Systems and methods consistent with the invention may determine whether a permanent type lock exists for a data object. If the permanent type lock does exist, systems and methods consistent with the invention may store the data object, the ID of which is contained in the at least one transactional type lock object, at the second storage location, store the ID of that data object in a permanent type lock object, assign the second storage location to the ID in the at least one permanent type lock object, and delete the ID of that data object in the transactional type lock object.

27 Claims, 9 Drawing Sheets

U.S. PATENT DOCUMENTS

| | | | |
|---|---|---|---|
| 5,504,900 | A | 4/1996 | Raz |
| 5,548,750 | A * | 8/1996 | Larsson et al. ............... 707/204 |
| 5,557,792 | A | 9/1996 | Josten et al. |
| 5,566,319 | A | 10/1996 | Lenz |
| 5,748,870 | A | 5/1998 | Tims et al. |
| 5,761,660 | A | 6/1998 | Josten et al. |
| 5,822,773 | A * | 10/1998 | Pritchard et al. ............ 711/162 |
| 5,835,906 | A | 11/1998 | Hagersten et al. |
| 5,835,953 | A * | 11/1998 | Ohran ........................ 711/162 |
| 5,913,213 | A | 6/1999 | Wikstrom et al. |
| 6,088,693 | A | 7/2000 | Van Huben et al. |
| 6,226,641 | B1 | 5/2001 | Hickson et al. |
| 6,269,382 | B1 * | 7/2001 | Cabrera et al. ............... 707/204 |
| 6,324,581 | B1 | 11/2001 | Xu et al. |
| 6,334,134 | B1 | 12/2001 | Haderle et al. |
| 6,343,296 | B1 | 1/2002 | Lakhamraju et al. |
| 6,353,836 | B1 | 3/2002 | Bamford et al. |
| 6,405,274 | B1 | 6/2002 | Chan |
| 6,412,034 | B1 | 6/2002 | Chan |
| 6,507,853 | B2 | 1/2003 | Bamford et al. |
| 6,557,082 | B1 | 4/2003 | Josten et al. |
| 6,594,683 | B1 | 7/2003 | Furlani et al. |
| 6,651,123 | B1 | 11/2003 | Hutchison et al. |
| 6,772,155 | B1 | 8/2004 | Stegelmann |
| 6,772,177 | B2 * | 8/2004 | Hsiao et al. ................. 707/204 |
| 6,772,255 | B2 | 8/2004 | Daynes |
| 6,775,750 | B2 | 8/2004 | Krueger |
| 6,839,819 | B2 | 1/2005 | Martin |
| 6,850,938 | B1 | 2/2005 | Sadjadi |
| 6,880,102 | B1 * | 4/2005 | Bridge ........................... 714/6 |
| 6,944,615 | B2 | 9/2005 | Teng et al. |
| 6,950,834 | B2 | 9/2005 | Huras et al. |
| 6,952,707 | B1 | 10/2005 | Josten |
| 7,028,287 | B2 | 4/2006 | Bak et al. |
| 7,036,043 | B2 | 4/2006 | Martin et al. |
| 7,222,142 | B2 | 5/2007 | Fischer et al. |
| 7,251,661 | B1 * | 7/2007 | Reed et al. .................. 707/101 |
| 2001/0056425 | A1 | 12/2001 | Richard |
| 2002/0087476 | A1 | 7/2002 | Salas et al. |
| 2003/0004945 | A1 | 1/2003 | Teng et al. |
| 2003/0004975 | A1 * | 1/2003 | Nakano et al. ............... 707/200 |
| 2006/0101094 | A1 | 5/2006 | Fischer et al. |
| 2006/0129768 | A1 | 6/2006 | Pferdekaemper et al. |
| 2006/0149696 | A1 | 7/2006 | Pferdekaemper et al. |
| 2006/0149736 | A1 | 7/2006 | Pferdekaemper et al. |
| 2006/0155704 | A1 | 7/2006 | Fischer et al. |

OTHER PUBLICATIONS

Ralf Schaarschmidt et al., "Datenbankbasiertes Archivieren im SAP System R/3," WI-Aufsatz, Wirtschaftsinformatik 39 (1997) 5, pp. 469-477.

PCT Search Report mailed Mar. 30, 2004 for PCT/EP2003/09828.

Martin Fischer et al., U.S. Appl. No. 10/656,208, filed Sep. 8, 2003, entitled "Methods and Systems for Controlling Access to a Data Object."

Martin Fischer et al., U.S. Appl. No. 10/526,747, filed Nov. 14, 2005, entitled "Methods and Systems for Moving Data Objects."

Thorsten Pferdekaemper et al., U.S. Appl. No. 10/526,504, filed Oct. 24, 2005, entitled "Methods and Systems for Archiving Data."

Martin Fischer et al., U.S. Appl. No. 10/526,749, filed Nov. 14, 2005, entitled "Methods and Systems for Moving Data Using Locks."

Thorsten Pferdekaemper et al., U.S. Appl. No. 10/526,750, filed Nov. 14, 2005, entitled "Methods and Systems for Controlling Access to a Data Object by Means of Locks."

Thorsten Pferdekaemper et al., U.S. Appl. No. 10/526,751, filed Nov. 14, 2005, entitled "Electronic Data Structure for Controlling Access to Data Objects Using Locks."

Daugherty et al., "Multi-Axial Subassemblage Testing System (MAST) Data Collection and Telepresence Systems Specification," A Report from the National Science Foundation, George E. Brown, Jr. Network for Earthquake Engineering Simulation (NEES), Department of Civil Engineering, Institute of Technologoy, University of Minnesota, Jul. 15, 2002.

Cabrera, Luis-Felipe et al., "Applying Database Technology in the ADSM Mass Storage System," Proceedings of the 21st VLDB Conference, 1995, pp. 597-605.

* cited by examiner

Persistent Lock Object

| ID 1 | Archive |
|---|---|
| AB | 001 |
| BB | 002 |
| BC | 002 |
| CF | 003 |
| ... | ... |

Transactional Lock Object

| ID 2 |   |   |   |
|---|---|---|---|
| AB |   | BC | CF |
| ... |   |   |   |

Table 1

| Field A | Field B | Filed C | ... | Field X |
|---|---|---|---|---|
| A | B |   |   |   |
|   |   |   |   | G |
| B | C |   |   |   |
| C | F |   |   |   |
| ... | ... |   |   | ... |

Table 2

| Field A | Field B | Filed C | ... | Field Y |
|---|---|---|---|---|
| E | L |   |   |   |
| F | K |   |   |   |
|   | H |   |   | M |
| C | F |   |   |   |
| ... | ... |   |   | ... |

METHODS AND SYSTEMS FOR DATA MOVING USING LOCKS

This application is a national stage filing under 35 U.S.C. §371 of International Application No. PCT/EP2003/009831, filed on Sep. 4, 2003, which published in the English language, and claims the benefit of priority to U.S. Provisional Application No. 60/408,901, filed on Sep. 9, 2002, 60/408,902, filed on Sep. 9, 2002, 60/408,903, filed on Sep. 9, 2002, 60/408,905, filed on Sep. 9, 2002, 60/409,606, filed on Sep. 11, 2002, and 60/409,593, filed on Sep. 11, 2002.

BACKGROUND OF THE INVENTION

1. Field of the Invention

The technical field of this invention is in the area of electronic data processing. More particularly, the invention relates to methods, computer program products and systems for data moving.

2. Description of the Related Art

Moving of data objects is well known to every user of a computer and is a standard procedure, which is routinely applied. A special application of moving data objects is the archiving process, by which data objects are moved from a first to a second storage location for safety and/or performance reasons. In enterprises, enterprise resource planning software (ERP) applications are used to control or support business processes and the management of the enterprise. ERP software is further used to manage company information of enterprises of various kinds in any field of technology by means of automatic data processing systems such as computers or computer systems. During the use of such software a huge amount of data is usually created, which contains important business information and which has to be archived from time to time.

According to the state of the art (see Helmut Stefani, Datenarchivierung mit SAP, Galileo Press GmbH, Bonn 2002, ISBN 3-89842-212-7), archiving can be performed automatically by archiving software tools, which can be part of the ERP software. Such tools can consist of a writing module, which stores (writes) the data objects to be archived sequentially in archive files, and a deleting module, which deletes the successfully archived data from the original data object base. The writing module can select the data objects to be archived from the data base according to specific criteria, e.g. the creation time of the data. It usually does not modify the original data objects or data base. The deleting module staggeredly reads the archive file sequentially and deletes the data objects found in the archive file from the original data base. This ensures that only such data objects are deleted from the original data base, which are readably stored in the archive file. The time for the archiving procedure as a whole depends on the amount of data and varies from a few milliseconds to several hours or days. Consequently, there is in many cases a considerable time gap between writing the data into the archive file and deleting the data from the original data base. This time gap can be a reason for the following problems:

As long as the data objects are still available in the original database, they can still be modified during the time gap. Because the deleting program does not compare the archived data object and the data object to be deleted, such modifications can be lost. This has not only the consequence of the loss of the amended data, it can additionally have the consequence that certain business processes can not be completed.

Another problem arises if several archiving processes run in parallel. In this scenario, that one data object can be archived several times, and is no longer unambiguously identifiable. This can have the consequence that evaluations or statistical analysis, which use the archive files, produce wrong results.

It is also possible that data objects in the original database are read by the writing module and are simultaneously modified by another software application. In such a case, the data can be transferred from an archiveable status to a non-archiveable status. As a result, data objects which are not archiveable are written into the archive file and are deleted from the original database. In effect, this can result in a loss of data.

Thus, there is a need for a method and/or data processing system providing a more efficient solution of the problems described above.

SUMMARY OF THE INVENTION

In accordance with embodiments of the invention, as embodied and broadly described herein, methods and systems are provided for moving data objects in a computer system from a first storage location to a second storage location, comprising:

selecting one or more data objects having an identifier (ID) from the first storage location;

storing the ID in at least one lock object;

storing a data object, the ID of which is contained in the at least one lock object, at the second storage location and assigning the second storage location to the ID in the at least one lock object;

deleting the data object, the ID of which is contained in the at least one lock object, from the first storage location; and deleting the ID from the at least one lock object after the step of deleting the data object from the first storage location for the respective data object assigned to that ID has been completed.

By using this method, software applications, which require access to data objects, can check by querying the lock object, whether the data to be accessed are subject to a moving process or not. If yes, the access to that data can be postponed until the moving is completed.

In accordance with additional embodiments of the invention, as embodied and broadly described herein, computer systems are provided for processing data, comprising:

memory means for storing program instructions;

input means for entering data;

storage means for storing data; and a processor responsive to the program instructions, the program instructions comprising program instructions adapted to carry out the method described above.

The invention and its embodiments are further directed to a computer readable medium and a carrier signal comprising instructions for processing data according to the inventive method and in its embodiments.

One advantage of the invention and its embodiments is that the security against data loss in data moving and archiving procedures may be greatly improved. This may avoid spending a lot of time and money for data retrieval.

Additional objects and advantages of the invention and its embodiments will be set forth in part in the description, or can be learned by practice of the invention. Objects and advantages may be realized and attained by means of the elements and combinations particularly pointed out in the appended claims. Embodiments of the invention are disclosed in the detailed description section and in the dependent and appended claims as well.

It is understood that both the foregoing general description and the following detailed description are exemplary and explanatory only and are not restrictive of the invention and its embodiments, as claimed.

BRIEF DESCRIPTION OF THE DRAWINGS

The accompanying drawings, which are incorporated in and constitute a part of this specification, illustrate examples of embodiments of the invention and, together with the description, explain the principles of the invention. In the drawings.

FIG. 2 is a schematic diagram of an exemplary structure of a data object in accordance with the principles of the inventive method.

DETAILED DESCRIPTION

Figure 1:
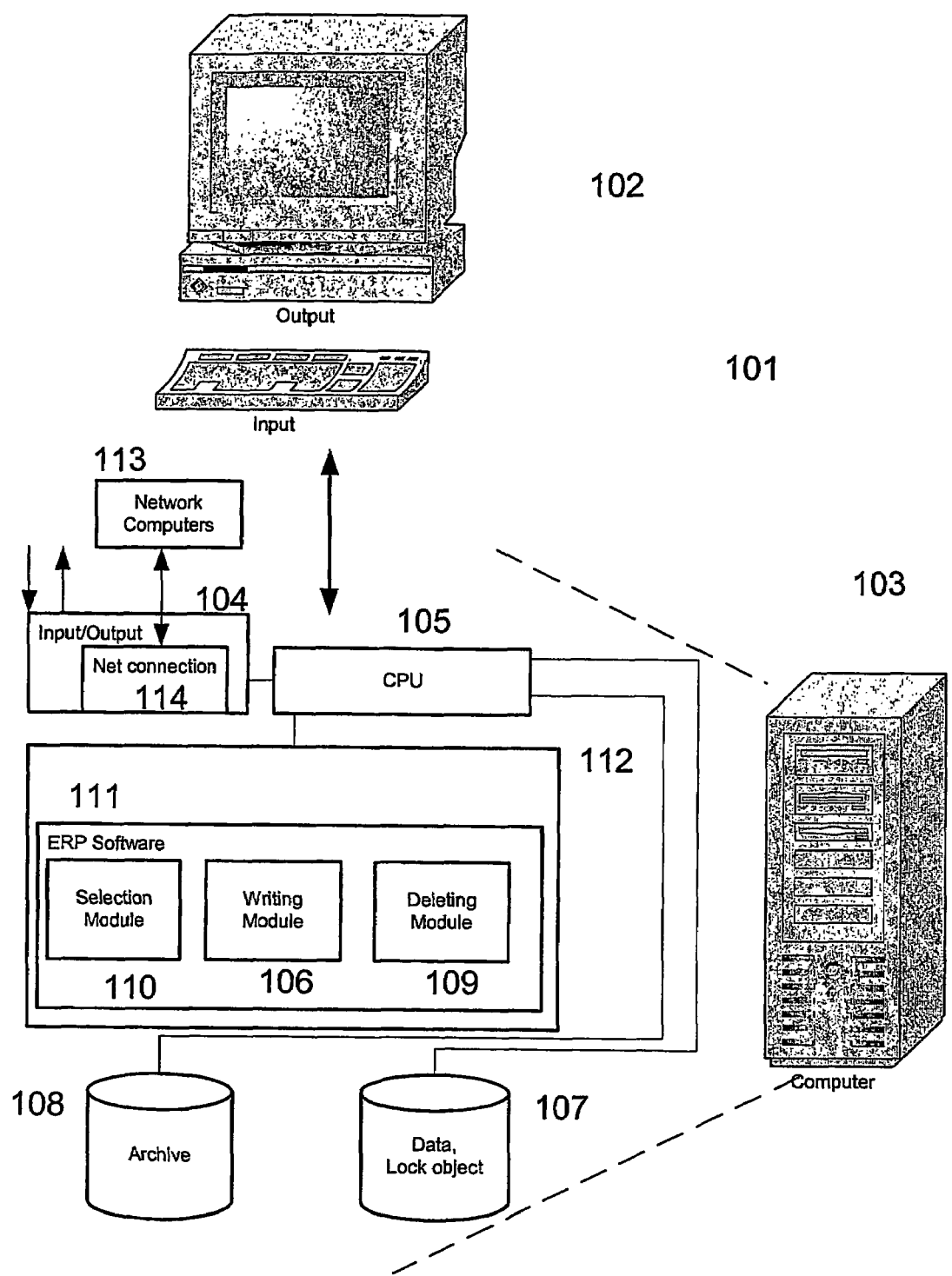
FIG. 1 is a schematic block diagram of an exemplary computer system for implementing methods consistent with the present invention.

Computer systems and programs are closely related. As used hereinafter, phrases, such as "the computer provides," "the program provides or performs specific actions," and "a user performs a specific action" are convenient abbreviations to express actions by a computer system that is controlled by a program or to express that the program or program module is designed to enable the computer system to perform the specific action or the enable a user to perform the specific action by means of a computer system.

Within the concept of this description, the terms used shall have their usual meaning in the context of the field of data processing unless defined otherwise in the following section:

A computer system can be a stand alone computer such as a PC or a laptop or a series of computers connected as a network, e.g. a network within a company, or a series of computers connected via the internet. A data object to be archived can be any kind or type of data, e.g. numerical or textual data, image data, meta data, irrespective whether the data are implemented as whole files or parts of files or fields in tables, irrespective whether they are stored in volatile memory or nonvolatile memory. As an example, data objects according to the present invention can be implemented as one or more fields of one or more tables, particularly of tables of a relational data base system, or as objects in an object orientated programming language.

The term ERP software shall be considerer to comprise any software application that supports the business processes of an enterprise.

A storage location is volatile or nonvolatile storage means accessible by the computer system. It can be any kind of computer storage means known to one of ordinary skill, e.g. RAM, magnetical or optical storage, such as floppy disk, hard disk, MO-Disk, CD-ROM, CD RW, DVD ROM, DVD RW, etc. The first and second storage location can be identical. In this case, the archived data objects have to be stored at a place different to the place of the original data objects to be archived. The second storage location can also be implemented as a file, located anywhere in the accessible nonvolatile storage means. Such file is subsequently referred to as archive file.

An identifier (ID) is a type of data, which allows an unambiguous identification of the data object to be archived. It can be implemented, for example, as a number or a combination of alphanumerical characters or as a characteristic part of the data object to be archived. It is clear from that definition that a data object can have a wide variety of IDs. A lock object is a data object, in which the identifiers are stored. It can be implemented e.g. as a file on a storage means or as a data array in computer memory. A first lock object is stored advantageously in a nonvolatile storage means and a second lock object is stored in volatile and/or nonvolatile storage means.

The assignment of the second storage location to an ID can be implemented by a table, in which one field of a line contains the ID and another field of that line contains a link to the second storage location, e.g. a file name. This table can be stored as a file on a nonvolatile storage means.

FIG. 1 is a schematic block diagram of an exemplary implementation of a computer system. FIG. 1 shows a computer system 101 comprising a computer 103 having a CPU 105, a working storage 112, in which an ERP software 111 is stored for processing by CPU 105. ERP software 111 comprises program modules 106, 109, 110 for carrying out the inventive data archiving process. Computer system 101 further comprises input means 113, output means 112 for interaction with a user, and general input/output means 104, including a net connection 114, for sending and receiving data. A plurality of computer systems 101 can be connected via the net connection 114 in the form of a network 113. In this case, the network computers 113 can be used as further input/output means, including as further storage locations. Computer system 103 further comprises a first storage means 107, in which data to be archived and the lock object are stored, and a second storage means 108, in which the archived data are stored.

In case the program modules 106, 109, 110 are processed by CPU 105 in order to carry out the inventive process, one or more data objects stored in the first storage means 107 are selected by selection module 110. Selection module 110 stores the ID of the selected data object in the lock object at the storage location 107. Writing module 106 reads the data objects and the lock object and stores such data objects, the ID of which are contained in the lock object to the second storage location 108. Additionally, the second storage location 108 is assigned to the respective ID of the data object in the lock object. Deleting module 109 then reads the archived data objects in the second storage location 108 and deletes the data objects, which it could successfully read from the original set of data objects in the first storage location 107. After deleting a specific data object, to which an ID was assigned, that ID is deleted from the lock object.

In an alternative embodiment, the lock object may be created by the selection module and not by the writing module.

In a second implementation of the invention, a data object to be archived may comprise one or more fields of one or more tables, and the ID of the respective object may comprise one or more key fields of that data object. This can best be seen from FIG. 2. In this instance, various sets of data objects are created in the form of two-dimensional data arrays, i.e., two tables (table 1 and table 2) having columns named field A to field X and field A to field Y, respectively, and a certain, unspecified number of lines. A field of the array or table is defined by the name of the column and the respective line. Such a field can contain data to be archived. It can alternatively contain a reference to a line of a further table. For example, in table 1 field X in line 2 contains a reference to line 3 in table 2. A data object 201.x to be archived comprises of fields of one line of the respective table. If one of the fields contains a reference to a line of an other table, fields of this referenced line belong to the data object as well. In the example in FIG. 2, a data object 201.x to be archived comprises the fields of line 2 in table 1 and fields of line 3 in table 2.

An ID of such a data object can be implemented by the content of one or more so-called key fields, if the combination of these key fields is unique within the respective table. In the example, the fields of "field A" and "field B" can be used as key fields for table 1, whereas field A alone is key field in table 2. Within this example, the data object has the content of the fields of columns field A and B of the respective lines as ID. The ID for the data object 201.x to be archived is stored as a first type ID in a first type lock object 203, named permanent lock object in FIG. 2, and as a second type ID in a second type lock object 204, named transactional lock object. The permanent lock object may be implemented as a table having two columns, the first of which contains the first type ID 1. The second type ID, ID 2, can be implemented as a one-dimensional data array stored in the working memory of the computer system. However, it can be implemented as a file on a nonvolatile storage means, too. The first type ID, ID 1, may be deleted after the selected data object has been deleted according to the inventive process, and the second type ID, ID 2, may be deleted immediately after. Alternatively, type ID 1 IDs can be deleted after all the selected data objects have been deleted. As can be seen, both ID types have identical content, the ID of the respective lines of the data to be archived. The permanent lock objects further contain a column by which a filename is may be assigned to the ID of the data object, i.e., that data object to be archived. In the example, line 1 is archived in a file named 001, lines 2 and 3 in file 002, and line 4 in file 003.

The selection of the data object can be implemented by an automatic procedure, such as by a simple query, that returns all lines having a certain field that satisfies a certain condition. For example, the procedure could return all lines in which the content of a date field pre-dates or post-dates a certain deadline. Selection can also be implemented by a user to whom a selection table is presented via a graphical user interface.

A further embodiment may comprising storing the ID in the second lock object immediately after selecting one or more data objects having an identifier (ID) from the first storage location for the respective data object. Alternatively, the ID of the selected data object is stored in the second lock object before storing the data object assigned to that ID is started.

A further embodiment may comprise storing the IDs of all selected data objects in the first lock object before the storing the data object at the second storage location.

In a further embodiment the invention may comprise checking whether an ID for that data object has been stored in a lock object, and if the ID has been stored, not storing the data object, the ID of which is contained in at least one lock object, at the second storage location for that data object.

Additionally, the invention can comprise checking whether the data object is contained in the second storage location, and if the data object is contained in the second storage location, not storing the data object, the ID of which is contained in at least one lock object, at the second storage location for that data object.

Another embodiment may comprise checking by querying a lock object.

In yet another embodiment, the checking can comprise checking whether the data object assigned to the respective ID has been completely stored in the second storage location and, in if the data object has not been completely stored, skipping the step of deleting the data object from the first storage location and the step of deleting the ID from the at least one lock object after the respective data object assigned to that ID has been deleted for that data object and deleting the ID from the lock object.

Embodiments of the invention are now described in more detail with reference to FIGS. 3 to 5, which are schematic flow diagrams of exemplary methods that may be implemented by the selecting, writing and deleting modules, respectively, as shown in FIG. 1. Within the context of this description, and particularly with respect to FIGS. 3 to 9, a first type ID is called a P-lock (permanent) and a second type ID is called a T-lock (transactional). Therefore, setting a P or T-lock for a selected object means to store an ID of that object in a respective lock object. The term "permanent" results from the property of the P-lock of existing permanently, as long as the data object is not yet deleted from its original storage location. The term "transactional" results from the property of the T-lock of existing only as long as a specific action (e.g. checking of archiveability) is performed on a selected data object or, in other words, of being deleted after the respective action has been performed.

Figure 3:
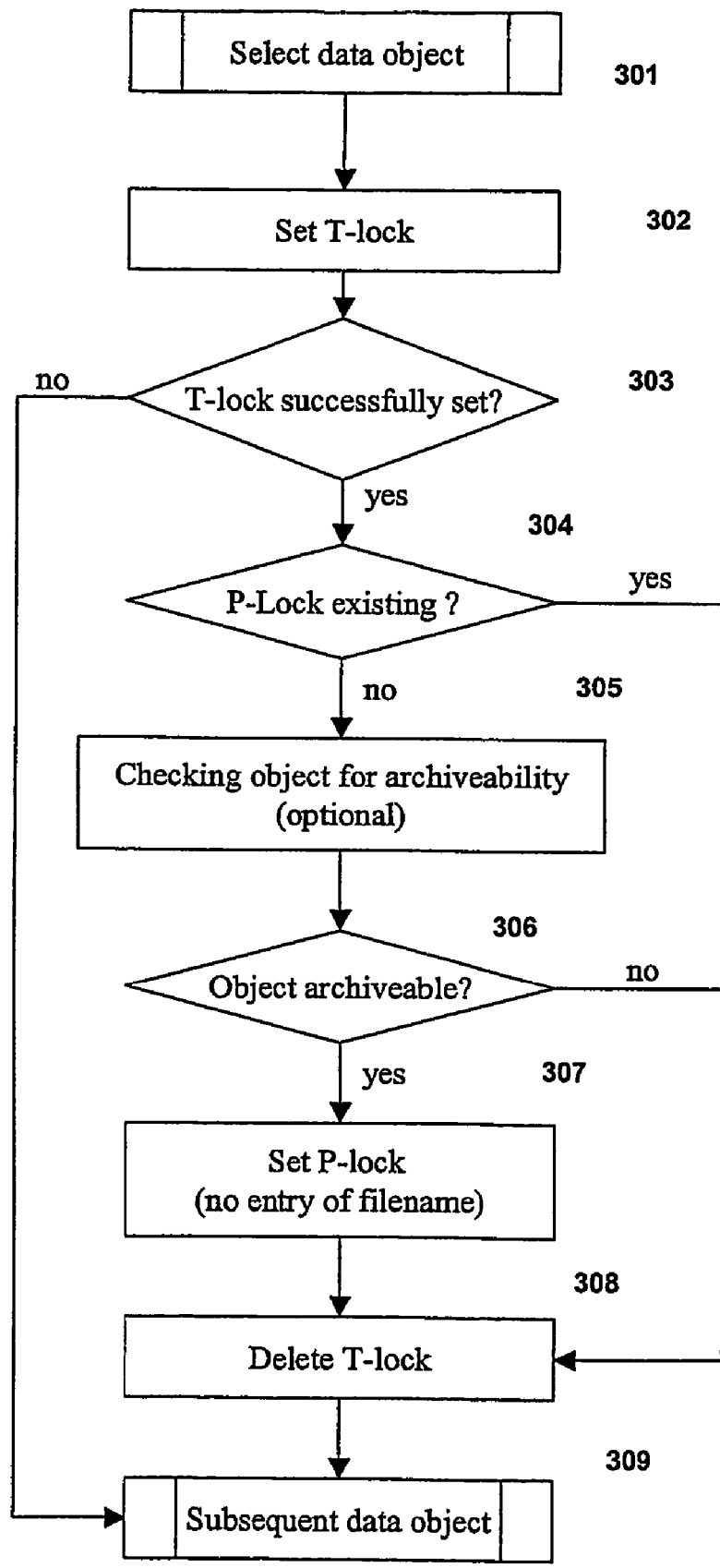
FIG. 3 is a flow diagram of an exemplary method for implementation by the selecting module shown in FIG. 1.

In the exemplary flow chart of the selecting module in FIG. 3, a data object is selected in a first step 301. Subsequently, a T-lock is set on this object in step 302. If the T-lock was successfully set (step 303), that is, if it did not yet exist, it is checked in step 304 whether a P-lock already exists in the selected data object. If not, the next data object is selected in step 309. The setting of the T-lock (step 302) and the check (step 303), whether it is successfully sets can advantageously be implemented as one "atomic" step. This means that both steps can be executed essentially at the same time or, in other words, the time gap between both steps can be essentially zero.

Both checks (steps 303 and 304) can also be implemented by querying the respective lock objects. If a P-lock exists, the T-lock is deleted (step 308) and the next data object is selected (step 309). If no P-lock exists, it is checked in steps 305 and 306 whether the data object is archiveable. Such checking can comprise a test of whether the data in the data object is readable, complete, or not fraught with obvious failures etc. If the test is successful, a P-lock is set on that data object in step 307, whereby no archive file is assigned to the data object at that point. Then the T-lock is deleted (step 308) and the next data object is selected (step 309).

Figure 4:
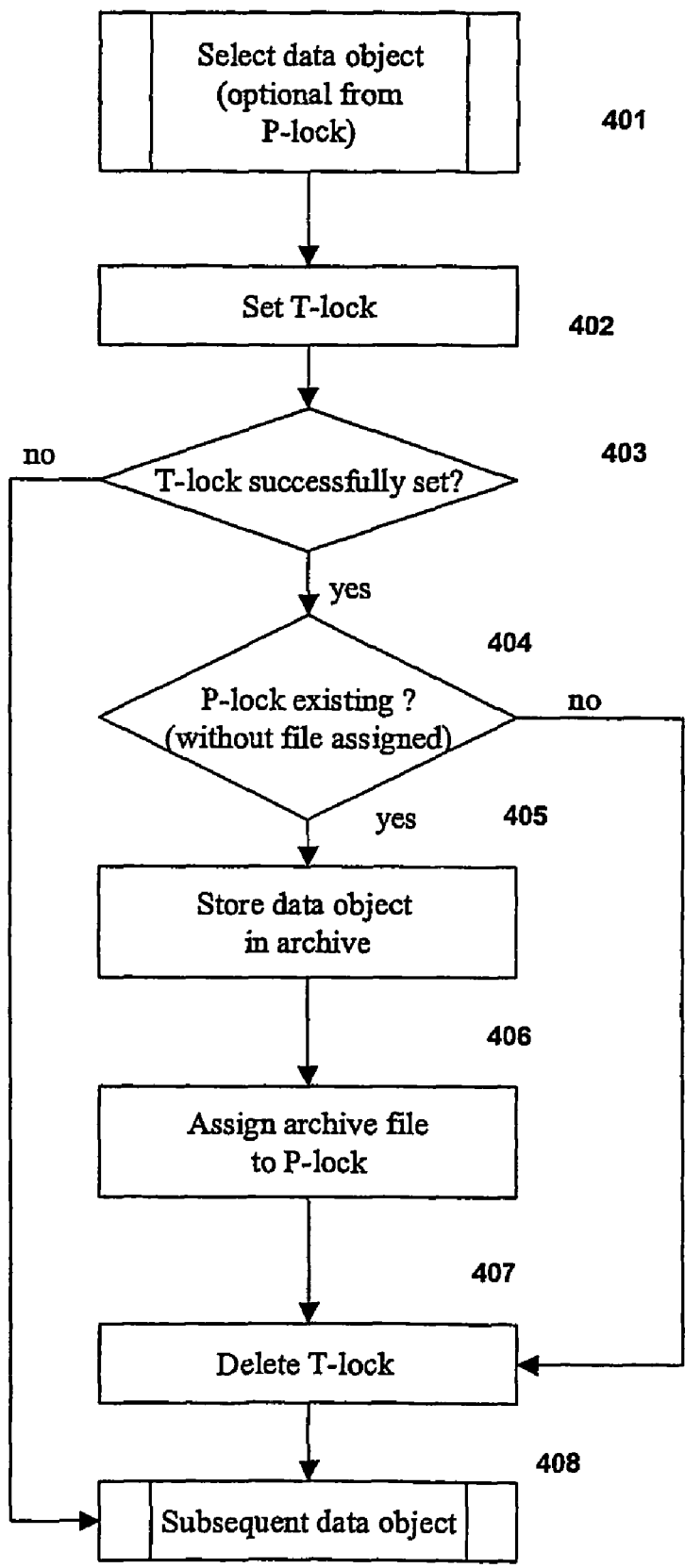
FIG. 4 is a flow diagram of an exemplary method for implementation by the writing module shown in FIG. 1.

In the exemplary flow chart of the writing module in FIG. 4, a data object is selected in a first step 401. Subsequently, a T-lock is set on this object in step 402. If the T-lock was successfully set (step 403), it is checked in step 404 whether a P-lock already exists in the selected data object, whereby no file must be assigned to that data object at that point of the process. If the condition is not fulfilled, the T-lock is deleted in step 407, and the next data object is selected in step 408. If a P-lock exists, the data object is stored in an archive file in step 405 and the archive file is assigned to the data object in step 406, e.g. by adding the file name to the lock object as shown in FIG. 2. Subsequently, the T-lock is deleted (step 407), and the next data object is selected (step 408).

Figure 5:
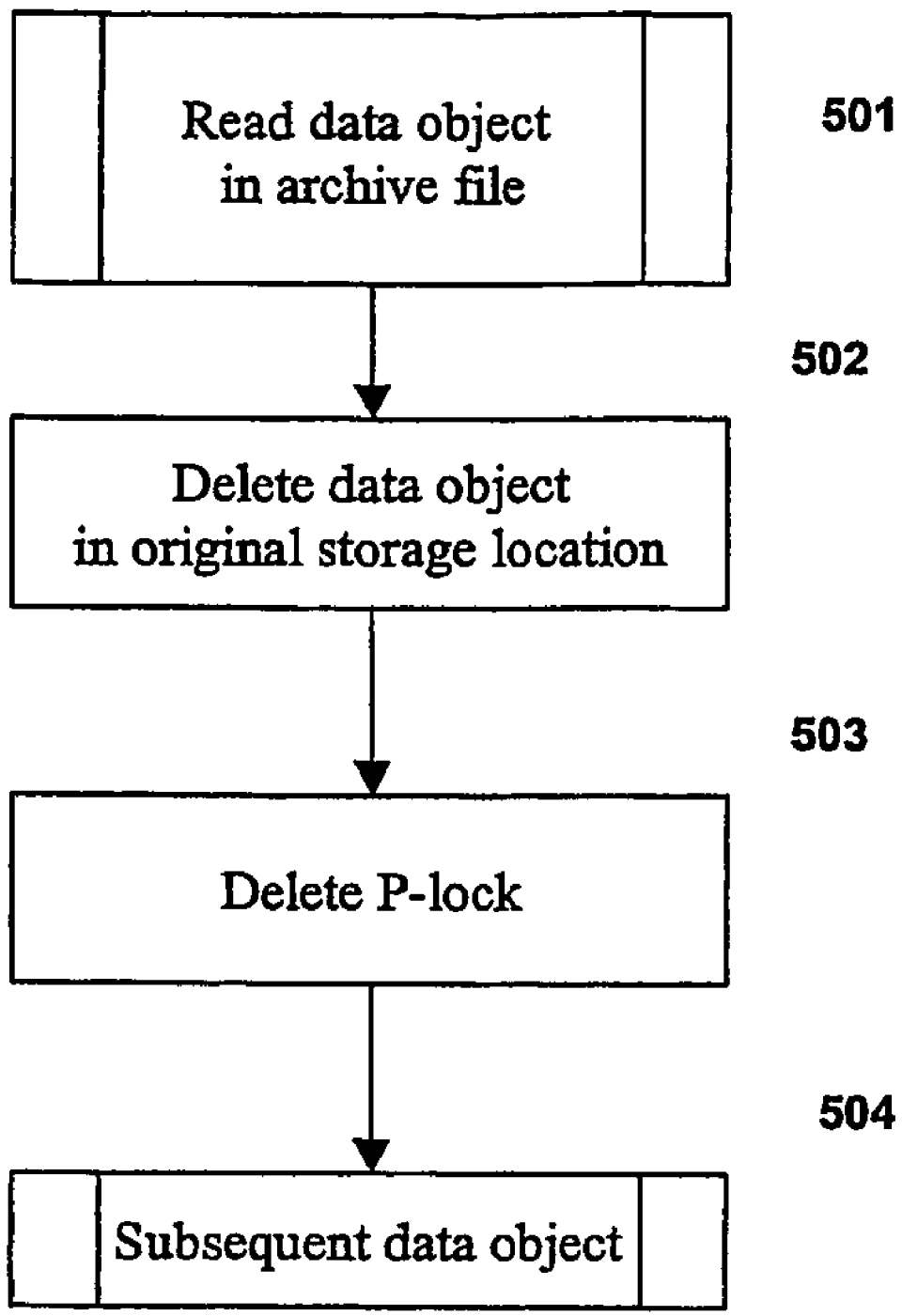
FIG. 5 is a flow diagram of an exemplary method for implementation by the deleting module shown in FIG. 1.

In the exemplary flow chart of the deleting module in FIG. 5, a data object that has already been archived is selected (step 501). This can be implemented by checking the archive files. If a data object has been selected and successfully read from the archive file, that data object is deleted from the original storage location (step 502), the P-lock is deleted (step 503), and the next data object is selected (step 504).

Figure 6:
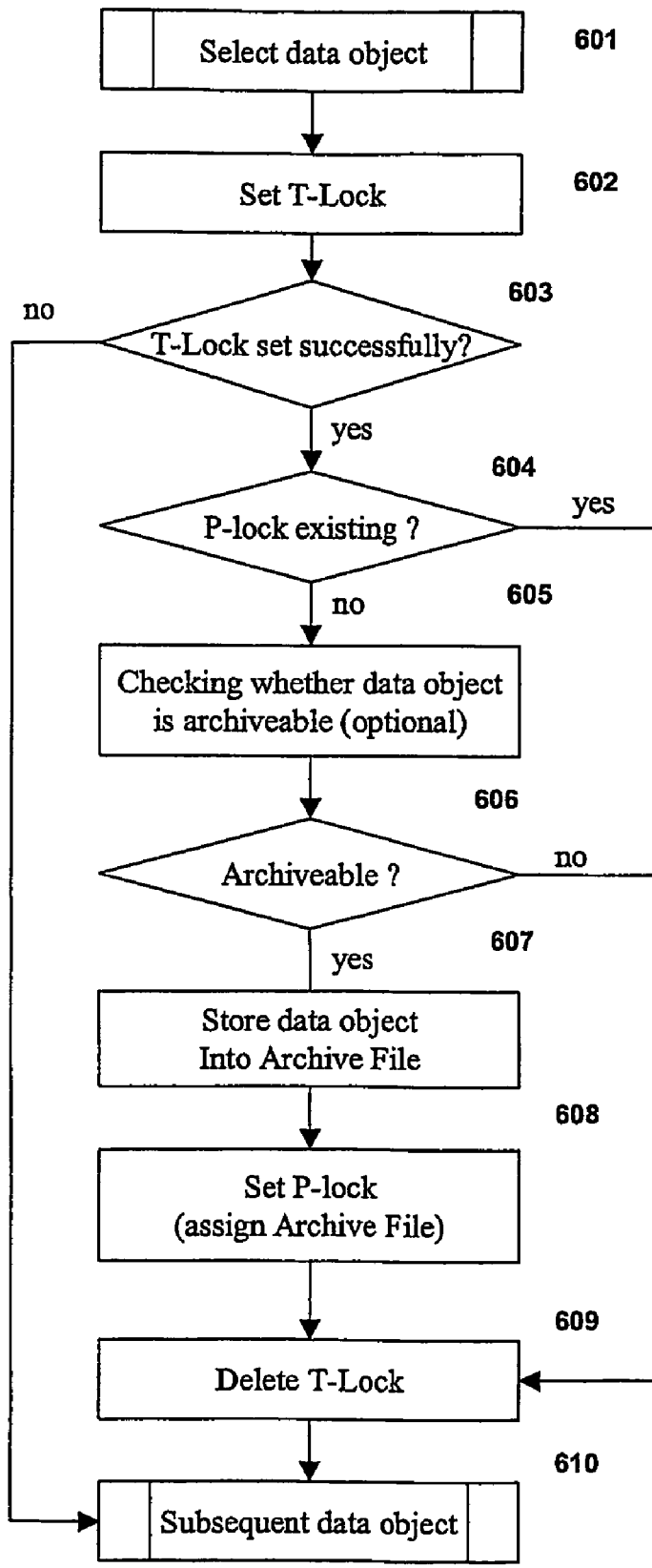
FIG. 6 is a flow chart of an exemplary method for implementation by the selection and writing module shown in FIG. 1.

In the exemplary flow chart of a further exemplary implementation in FIG. 6, the selecting and writing module described above are combined to one module. Accordingly, a data object is selected in a first step 601. Subsequently, a T-lock is set on this object in step 602. If the T-lock was successfully set (step 603), it is checked in step 604 whether a P-lock already exists in the selected data object. If the T-lock could not be set successfully, the next data object is selected (step 610). If a P-lock exists on that object, the T-lock is deleted (step 609) and the next data object is selected (step 610). If no P-lock exists on that object, it is checked in step 605 whether the data object is archiveable. If this check fails (step 606), the T-lock is deleted (step 609) and the next data object is selected (step 610). If the check is positive, the data object is stored (step 605) in an archive file, a P-lock is set (step 608) with the archive file assigned, the T-lock is deleted (step 609), and the next data object is selected (step 610).

Figure 7:
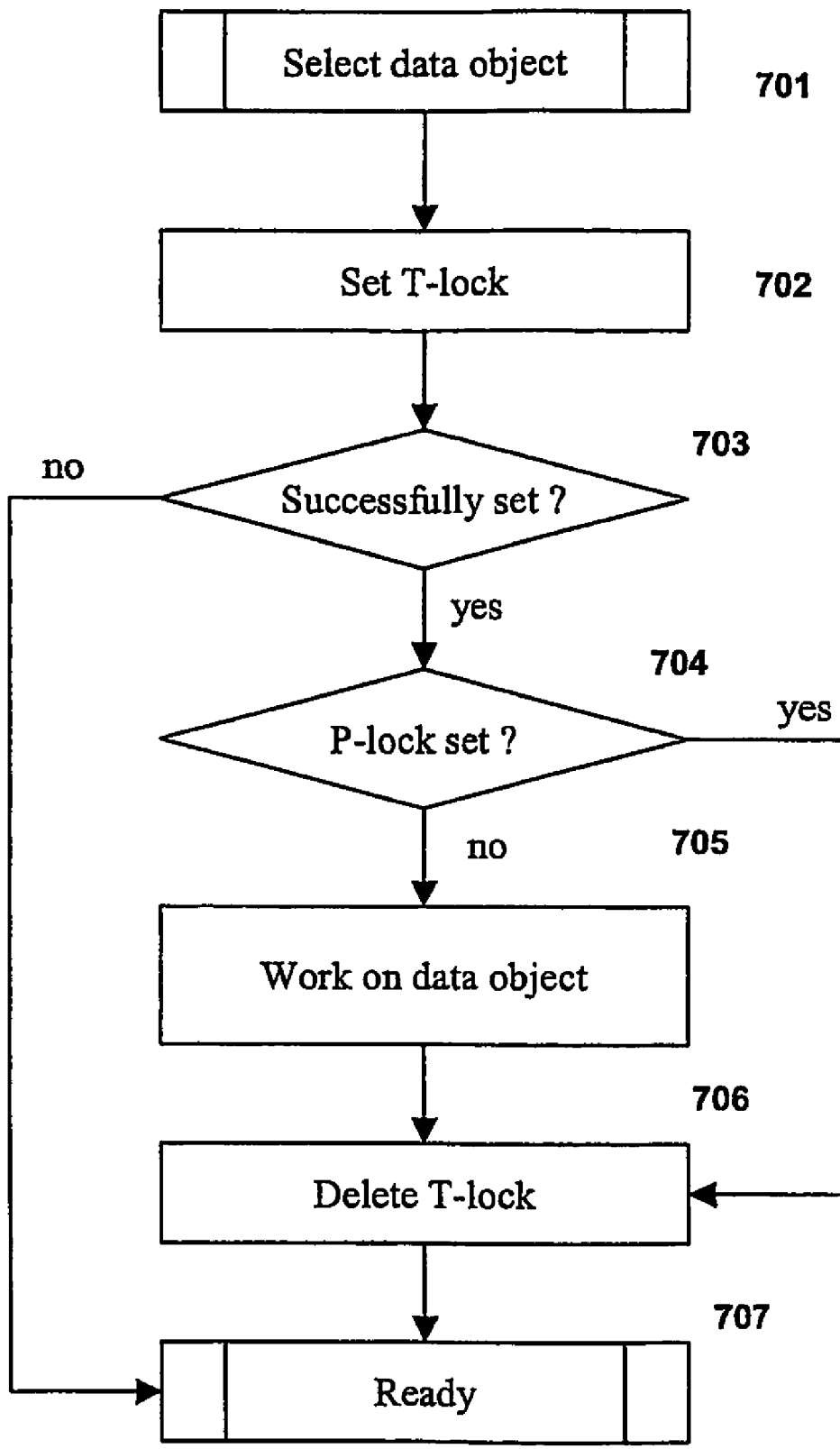
FIG. 7 is a flow chart of an exemplary method to demonstrate how any software application may use the concept of the P and T-locks.

FIG. 7 shows a flow chart of an exemplary method to demonstrate how any software application can use the concept of the P and T-locks to ensure that the measures, that the software application is going to apply on the data object, do not influence the archiving process. A software application that is programmed to have a read and/or write access to data objects, which can be subject of an archiving process as described, can comprise the following steps as shown in FIG. 7. In a first step 701, the data object is selected. Then, a T-lock is set in step 702 on that object by the application. If the T-lock is successfully set (step 703), it is checked in step 704, whether a P-lock exists on that object; otherwise the application terminates in step 707. If a P-lock exists on that object (step 704), the T-lock is deleted (step 706), and the application terminates (step 707). If no P-lock exists, i.e., the data object is not subject to an archiving process, the application can have read/write access to the data object in a working step 705. Subsequently, the application deletes the T-lock (step 706) and terminates (step 707).

Figure 8:
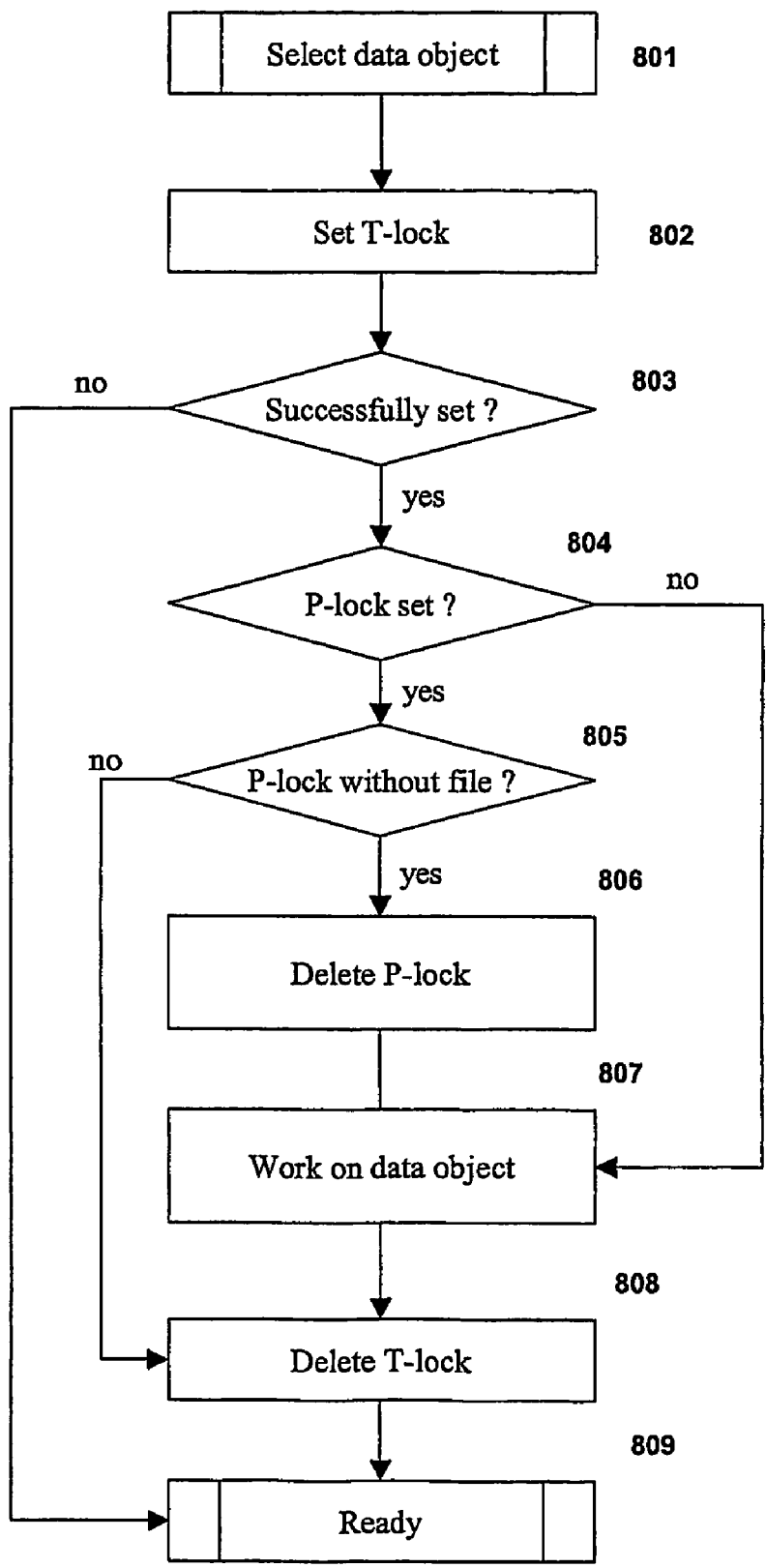
FIG. 8 is a flow chart of an exemplary method to demonstrate how any software application may use the concept of the P and T-locks, including a conditional deletion of a P-lock.

FIG. 8 is a flow chart of another exemplary method to demonstrate how any software application may use the concept of the P and T-locks, including a conditional deletion of a P-lock. In a first step 801, the data object is selected. Then, a T-lock is set on that object by the application (step 802). If the T-lock is successfully set (step 803), it is checked (step 804) whether a P-lock exists on that object; otherwise the application terminates (step 809). If no P-lock exists (step 804), i.e., the data object is not subject to an archiving process, the application can have read/write access to the data object in working step 807. Subsequently, the application deletes the T-lock (step 808) and terminates (step 809). If a P-lock exists (step 804), it is checked (step 805) whether a file is assigned to it. If a file is assigned, the application deletes the T-lock (step 808) and terminates (step 809). If no file is assigned, the P-lock is deleted (step 806), and the application can have read/write access to the data object (step 807). Subsequently, the application deletes the T-lock (step 808) and terminates (step 809).

This procedure is particularly useful, in that data objects, which are not yet stored in an archive file, can be still altered. Consequently, they can be archived only at the next archive run.

Figure 9:
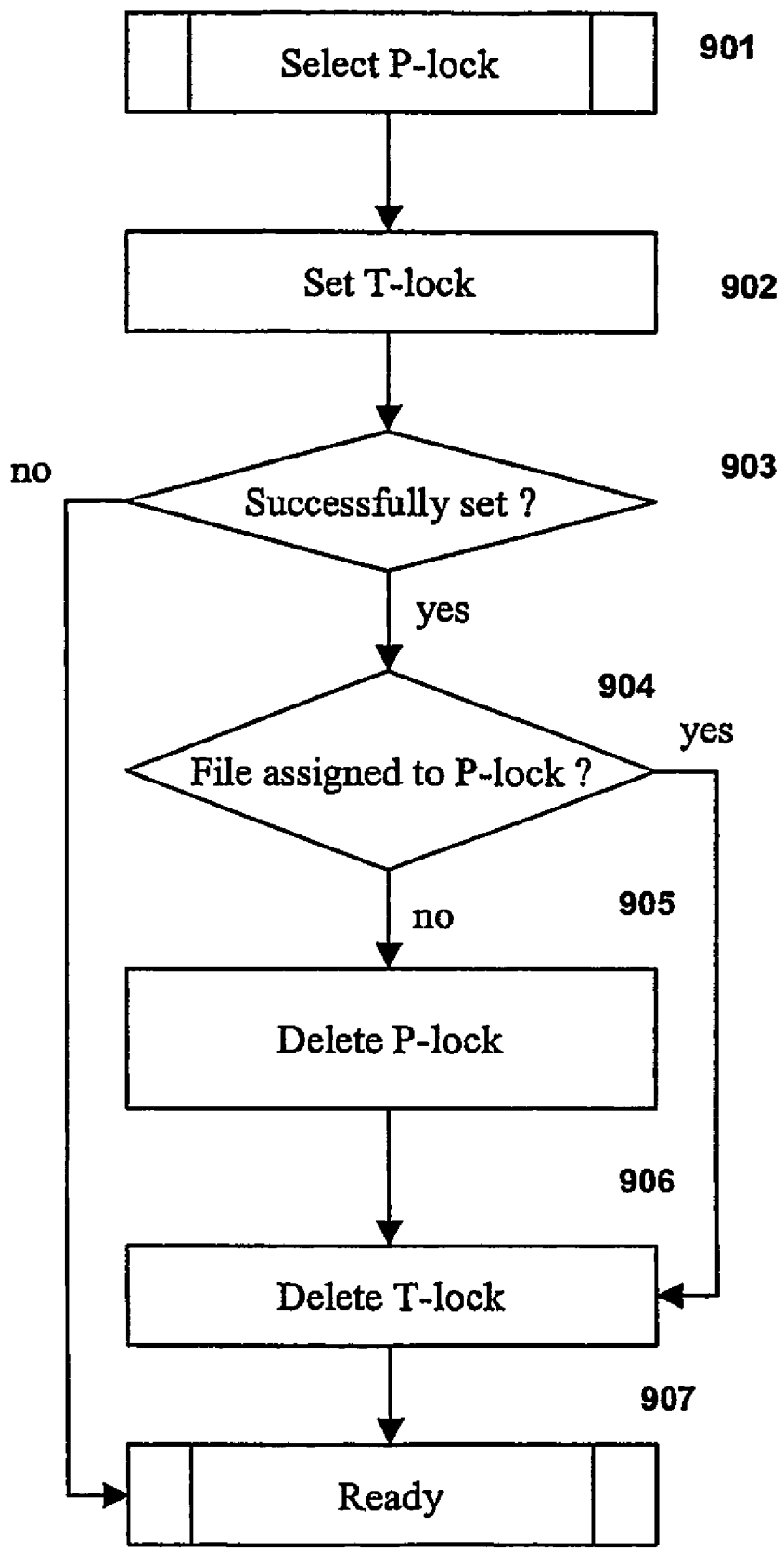
FIG. 9 is a flow chart for an exemplary method for implementation by a software module through which the locks can be deleted.

FIG. 9 is a flow chart of an exemplary method for implementation by a software module through which the locks set by the modules described above can be deleted. This can be useful in cases in which no archive files are assigned to P-locks or in which P-locks have been deleted for a user. Therein, a P-lock is nothing else than a data object and can be treated in the same way as described above. In a first step 901, a P-lock is selected. Then, a T-lock is set to the P-lock in step 902. If the T-lock is successfully set (step 903), it is checked in step 904, whether the P-lock has a file assigned. If the T-lock is not set successfully, the module terminates (step 907). If the selected P-lock has no file assigned (step 904), the P-lock is deleted (step 905). Then the T-lock is deleted (step 906) and the module terminates (step 907). Alternative to the termination (step 907), a next P-lock can be selected.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or can be acquired from the practicing of the invention. For example, the described implementation includes software, but systems and methods consistent with the present invention can be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet; or other forms of RAM or ROM. It is intended that the specification and examples be considered as exemplary only, with a true scope and spirit of the invention being indicated by the following claims.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of ®Java, C++, HTML, XML, or HTML with included Java applets or in SAP R/3 or ABAP.

What is claimed is:

1. A method for moving data objects in a computer system from a first storage location to a second storage location, comprising:
   selecting a data object stored in the first storage location;
   storing an identifier (ID) of the data object in a transactional type lock object;
   determining whether another process is moving the data object to the second storage location by determining whether the ID is stored in a permanent type lock object; and
   when the ID is not stored in the permanent type lock object and another process is not moving the data object to the second storage location, checking whether the data object is archiveable before storing the data object at the second storage location;
   when the data object is archiveable:
      storing the data object at the second storage location;
      storing the ID in the permanent type lock object;

assigning the second storage location to the ID stored in the permanent type lock object; and deleting the ID stored in the transactional type lock object.

2. The method of claim 1, further comprising:
deleting the data object from the first storage location; and
deleting the ID from the permanent type lock object after the data object has been deleted from the first storage location.

3. The method of claim 1, wherein the data object is stored in one or more files and wherein an assignment of the ID to the one or more files is stored in the permanent type lock object.

4. The method of claim 1, wherein:
the first storage location stores one or more data objects; and
one or more IDs of the one or more data objects are stored in the transactional type lock object immediately after selecting the one or more data objects.

5. The method of claim 1, wherein the ID is stored in the transactional type lock object before the data object is stored at the second storage location.

6. The method of claim 1, wherein:
the first storage location stores one or more data objects; and
IDs of all of the one or more data objects are stored in the permanent type lock object before storing any of the one or more data objects at the second storage location.

7. The method of claim 1, further comprising:
when the ID is stored in the permanent type lock object and another process is moving the data object to the second storage location, deleting the ID in the transactional type lock object.

8. The method of claim 1, further comprising:
determining whether the data object was stored successfully at the second storage location; and
when the data object has not been successfully stored at the second storage location, deleting the ID from the permanent type lock object.

9. The method of claim 1 for use in an enterprise resource planning software.

10. A computer system for processing data comprising:
a memory device for storing program instructions;
an input device for entering data;
a storage for storing data;
a processor responsive to the program instructions, wherein the program instructions comprise program code means for performing a method for moving data objects in the computer system from a first storage location to a second storage location, the method comprising:
selecting a data object stored in the first storage location;
storing an identifier (ID) of the data object in a transactional type lock object;
determining whether another process is moving the data object to the second storage location by determining whether the ID is stored in a permanent type lock object; and
when the ID is not stored in the permanent type lock object and another process is not moving the data object to the second storage location, checking whether the data object is archiveable before storing the data object at the second storage location;
when the data object is archiveable:
storing the data object at the second storage location;
storing the ID in the permanent type lock object;
assigning the second storage location to the ID stored in the permanent type lock object; and
deleting the ID stored in the transactional type lock object.

11. A computer readable medium comprising instructions for performing a method for moving data objects in a computer system from a first storage location to a second storage location, the method comprising:
selecting a data object stored in the first storage location;
storing an identifier (ID) of the data object in a transactional type lock object;
determining whether another process is moving the data object to the second storage location by determining whether the ID is stored in a permanent type lock object; and
when the ID is not stored in the permanent type lock object and another process is not moving the data object to the second storage location, checking whether the data object is archiveable before storing the data object at the second storage location;
when the data object is archiveable:
storing the data object at the second storage location;
storing the ID in the permanent type lock object;
assigning the second storage location to the ID stored in the permanent type lock object; and
deleting the ID stored in the transactional type lock object.

12. The computer readable medium of claim 11, wherein the method further comprises:
deleting the data object from the first storage location; and
deleting the ID from the permanent type lock object after the data object has been deleted from the first storage location.

13. The computer readable medium of claim 11, wherein the data object is stored in one or more files and wherein an assignment of the ID to the one or more files is stored in the permanent type lock object.

14. The computer readable medium of claim 11, wherein:
the first storage location stores one or more data objects; and
one or more IDs of the one or more data objects are stored in the transactional type lock object immediately after selecting the one or more data objects.

15. The computer readable medium of claim 11, wherein the ID is stored in the transactional type lock object before the data object is stored at the second storage location.

16. The computer readable medium of claim 11, wherein:
the first storage location stores one or more data objects; and
IDs of all of the one or more data objects are stored in the permanent type lock object before storing any of the one or more data objects at the second storage location.

17. The computer readable medium of claim 11, wherein the method further comprises:
when the ID is stored in the permanent type lock object and another process is moving the data object to the second storage location, deleting the ID in the transactional type lock object.

18. The computer readable medium of claim 11, wherein the method further comprises:
determining whether the data object was stored successfully at the second storage location; and
when the data object has not been successfully stored at the second storage location, deleting the ID from the permanent type lock object.

19. A computerized system for moving data objects from a first storage location to a second storage location, comprising:
a storage for storing instructions;
a processor for processing the instructions;

means for selecting a data object stored in the first storage location;

means for storing an identifier (ID) of the data object in a transactional type lock object;

means for determining whether another process is moving the data object to the second storage location by determining whether the ID is stored in a permanent type lock object; and means for, when the ID is not stored in the permanent type lock object and another process is not moving the data object to the second storage location, checking whether the data object is archiveable before storing the data object at the second storage location;

means for, when the data object is archiveable:
  storing the data object at the second storage location;
  storing the ID in the permanent type lock object;
  assigning the second storage location to the ID stored in the permanent type lock object; and
  deleting the ID stored in the transactional type lock object.

20. The computerized system of claim 19, further comprising:
  means for deleting the data object from the first storage location; and
  means for deleting the ID from the permanent type lock object after the data object has been deleted from the first storage location.

21. The computerized system of claim 19, wherein the data object is stored in one or more files and wherein an assignment of the ID to the one or more files is stored in the permanent type lock object.

22. The computerized system of claim 19, wherein:
  the first storage location stores one or more data objects; and
  one or more IDs of the one or more data objects are stored in the transactional type lock object immediately after selecting the one or more data objects.

23. The computerized system of claim 19, wherein the ID is stored in the transactional type lock object before the data object is stored at the second storage location.

24. The computerized system of claim 19, wherein:
  the first storage location stores one or more data objects; and
  IDs of all of the one or more data objects are stored in the permanent type lock object before storing any of the one or more data objects at the second storage location.

25. The computerized system of claim 19, further comprising:
  means for, when the ID is stored in the permanent type lock object and another process is moving the data object to the second storage location, deleting the ID in the transactional type lock object.

26. The computerized system of claim 19, further comprising:
  means for determining whether the data object was stored successfully at the second storage location; and
  means for, when the data object has not been successfully stored at the second storage location, deleting the ID from the permanent type lock object.

27. A method for moving data objects from a first storage location to a second storage location, the method comprising:
  selecting a data object stored in the first storage location;
  determining whether another process is attempting to perform a transaction with the data object by determining whether an identifier (ID) of the data object is stored in a transactional type lock object;
  when the ID is not stored in the transactional type lock object and another process is not attempting to perform a transaction with the data object, storing the ID in the transactional type lock object;
  determining whether another processing is moving the data object to the second storage location by determining whether the ID is stored in a permanent type lock object;
  when the ID is not stored in the permanent type lock object and another process is not moving the data object to the second storage location, determining whether the data object is archiveable, the data object being archiveable if the data object is readable, complete, and error-free;
  when the data object is archiveable:
    storing the ID in the permanent type lock object;
    storing the data object at the second storage location;
    assigning the second storage location to the ID in the permanent type lock object;
    deleting the data object from the first storage location; and
    deleting the ID stored in the permanent type lock object; and
  deleting the ID stored in the transactional type lock object.

* * * * *

UNITED STATES PATENT AND TRADEMARK OFFICE
CERTIFICATE OF CORRECTION

PATENT NO. : 7,653,667 B2  Page 1 of 1
APPLICATION NO. : 10/526748
DATED : January 26, 2010
INVENTOR(S) : Pferdekäemper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 12 days.

Signed and Sealed this

Twenty-third Day of November, 2010

David J. Kappos
*Director of the United States Patent and Trademark Office*